United States Patent
Anderson et al.

(10) Patent No.: US 11,030,116 B2
(45) Date of Patent: Jun. 8, 2021

(54) PROCESSING CACHE MISS RATES TO DETERMINE MEMORY SPACE TO ADD TO AN ACTIVE CACHE TO REDUCE A CACHE MISS RATE FOR THE ACTIVE CACHE

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/417,637

(22) Filed: May 20, 2019

(65) Prior Publication Data

US 2019/0272237 A1 Sep. 5, 2019

Related U.S. Application Data

(63) Continuation of application No. 15/629,249, filed on Jun. 21, 2017, now Pat. No. 10,540,295.

(51) Int. Cl.
*G06F 12/00* (2006.01)
*G06F 12/128* (2016.01)
(Continued)

(52) U.S. Cl.
CPC ........ *G06F 12/128* (2013.01); *G06F 12/0808* (2013.01); *G06F 12/0831* (2013.01); *G06F 12/0871* (2013.01); *G06F 12/122* (2013.01); *G06F 12/12* (2013.01); *G06F 2212/312* (2013.01); *G06F 2212/621* (2013.01)

(58) Field of Classification Search
None
See application file for complete search history.

(56) References Cited

U.S. PATENT DOCUMENTS 5,123,099 A 6/1992 Shibata et al.
5,148,540 A 9/1992 Beardsley et al.
(Continued)

OTHER PUBLICATIONS

Notice of Allowance dated Nov. 26, 2019, pp. 9, for U.S. Appl. No. 15/629,249, filed Jun. 21, 2017, (18.725).
(Continued)

*Primary Examiner* — Daniel D Tsui
(74) *Attorney, Agent, or Firm* — Konrad Raynes Davda & Victor LLP; David W. Victor (57) ABSTRACT

Provided are a computer program product, system, and method for processing cache miss rates to determine memory space to add to an active cache to reduce a cache miss rate for the active cache. During caching operations to the active cache, information is gathered on an active cache miss rate based on a rate of access to tracks that are not indicated in the active cache list and a cache demote rate. A determination is made as to whether adding additional memory space to the active cache would result in the active cache miss rate being less than the cache demote rate when the active cache miss rate exceeds the cache demote rate. A message is generated indicating to add the additional memory space when adding the additional memory space would result in the active cache miss rate being less than the cache demote rate.

20 Claims, 9 Drawing Sheets

(51) Int. Cl.
*G06F 12/0831* (2016.01)
*G06F 12/122* (2016.01)
*G06F 12/0808* (2016.01)
*G06F 12/0871* (2016.01)
*G06F 12/12* (2016.01)

(56) References Cited

U.S. PATENT DOCUMENTS

| | | |
|---|---|---|
| 5,179,687 A | 1/1993 | Hidaka et al. |
| 5,559,985 A | 9/1996 | Maemura |
| 5,777,942 A | 7/1998 | Dosaka et al. |
| 6,493,810 B1 | 12/2002 | Pang et al. |
| 6,754,791 B1 | 6/2004 | Braceras et al. |
| 7,752,395 B1 | 7/2010 | Fair et al. |
| 8,850,122 B2 | 9/2014 | Chockler et al. |
| 9,811,474 B2 | 11/2017 | Ash et al. |
| 9,824,030 B2 | 11/2017 | Ash et al. |
| 10,169,249 B2 | 1/2019 | Ash et al. |
| 2001/0037433 A1 | 11/2001 | Dempsey et al. |
| 2003/0088739 A1 | 5/2003 | Wilkes et al. |
| 2003/0188104 A1 | 10/2003 | Sullivan |
| 2004/0193803 A1 | 9/2004 | Mogi et al. |
| 2006/0174067 A1 | 8/2006 | Soules et al. |
| 2010/0076805 A1 | 3/2010 | Batsakis et al. |
| 2012/0089782 A1 | 4/2012 | McKean et al. |
| 2013/0111133 A1 | 5/2013 | Benhase et al. |
| 2013/0138889 A1 | 5/2013 | Chockler et al. |
| 2015/0046654 A1 | 2/2015 | Soundararajan et al. |
| 2015/0286564 A1 | 10/2015 | Lim et al. |
| 2015/0378892 A1 | 12/2015 | Tajima et al. |
| 2016/0342518 A1 | 11/2016 | Park et al. |
| 2018/0341599 A1 | 11/2018 | Ash et al. |
| 2018/0373645 A1 | 12/2018 | Anderson et al. |

OTHER PUBLICATIONS

Response dated Oct. 3, 2019, pp. 11, to Office Action dated Jul. 3, 2019, pp. 46, for U.S. Appl. No. 16/054,772, (18.604C2).

Notice of Allowance dated Nov. 4, 2019, pp. 12, for U.S. Appl. No. 16/054,772, (18.604C2).

Notice of Allowance dated Sep. 5, 2019, pp. 5, for U.S. Appl. No. 15/629,249, filed Jun. 21, 2017, (18.725).

Office Action dated Jul. 3, 2019, pp. 46, for U.S. Appl. No. 16/054,772, (18.604C2).

List of IBM Patents or Patent Applications Treated as Related, May 20, 2019, 2 pp. [18.725C1 (Appendix P)].

T. Saemundsson, et al. "Dynamic Performance Profiling of Cloud Caches", ACM, 2014, pp. 14.

Office Action dated Feb. 13, 2017, pp. 19, for U.S. Appl. No. 14/928,926, (18.604).

Response dated May 15, 2017, pp. 13, to U.S. Appl. No. 14/928,926, (18.604).

Notice of Allowance dated Jul. 7, 2017, pp. 15, for U.S. Appl. No. 14/928,926, (18.604).

Office Action dated Apr. 19, 2018, pp. 34, for U.S. Appl. No. 15/710,800, (18.604C1).

Response dated Jul. 19, 2018, pp. 10, to Office Action dated Apr. 19, 2018, pp. 34, for U.S. Appl. No. 15/710,800, (18.604C1).

Notice of Allowance dated Aug. 30, 2018, pp. 11, or U.S. Appl. No. 15/710,800, (18.604C1).

Office Action dated Feb. 10, 2017, pp. 23, for U.S. Appl. No. 14/928,948, (18.605).

Response dated May 10, 2017, pp. 12, to Office Action dated Feb. 10, 2017, pp. 23, for U.S. Appl. No. 14/928,948, (18.605).

Notice of Allowance dated Jun. 30, 2017, pp. 15, for U.S. Appl. No. 14/928,948, (18.605).

Notice of Allowance dated Feb. 28, 2019, pp. 27, for U.S. Appl. No. 15/629,249, filed Jun. 21, 2017, (18.725).

Cache Control Block

FIG. 3

Ghost Cache Control Block

FIG. 4

Time Interval Cache Access Statistics

FIG. 5

Calculated Miss Rates

PROCESSING CACHE MISS RATES TO DETERMINE MEMORY SPACE TO ADD TO AN ACTIVE CACHE TO REDUCE A CACHE MISS RATE FOR THE ACTIVE CACHE

BACKGROUND OF THE INVENTION

1. Field of the Invention

The present invention relates to a computer program product, system, and method for processing cache miss rates to determine memory space to add to an active cache to reduce a cache miss rate for the active cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

There is a need for improved techniques for determining when to add memory space to an active cache of a computing system.

SUMMARY

Provided are a computer program product, system, and method for processing cache miss rates to determine memory space to add to an active cache to reduce a cache miss rate for the active cache. During caching operations to the active cache, information is gathered on an active cache miss rate based on a rate of access to tracks that are not indicated in the active cache list over time and a cache demote rate based on a rate of an amount of data removed from the active cache over time. A determination is made as to whether the active cache miss rate exceeds the cache demote rate. A determination is made as to whether adding additional memory space to the active cache would result in the active cache miss rate being less than the cache demote rate in response to determining that the active cache miss rate exceeds the cache demote rate. A message is generated to a user of the computer system indicating to add the additional memory space to the active cache in response to determining that adding the additional memory space would result in the active cache miss rate being less than the cache demote rate.

DETAILED DESCRIPTION

A storage controller demotes tracks from an active cache to make room to cache for data for I/O requests, e.g., read or write requests. If the data for a read request is already in the cache, i.e., a cache hit, then the requested data does not need to be staged into the cache. If the data for the read request is not in the cache, i.e., a cache miss, or if there is write data for the request, then tracks in the cache may need to be demoted or removed from the cache to make space for the read data to stage into cache or the write data. Tracks are demoted based on caching algorithms. If the cache miss rate exceeds the cache demote rate, then the rate at which read data needs to be added to cache exceeds the rate at which data is demoted from cache, and then new I/O requests will need to be queued until space is freed in the cache. Such queuing of I/O requests can cause severe performance problems and high response times to the queued I/O requests.

Described embodiments provide technological solutions to cache computer technology to determine whether adding memory space to the cache could reduce the cache miss rate to be less than the cache demote rate and then send a message to the user indicating to add additional memory space. Further, the computer system may maintain unused cache partitions, referred to as ghost caches, and then calculate ghost cache miss rates for different combinations of unused cache partitions or ghost caches. The message to the user may indicate to immediately add the unused memory partitions, or ghost cache space, to the active cache to lower the cache miss rate to avoid queuing of I/O requests.

Described embodiments provide improvements and technological solutions to the problem in cache computer technology where cache miss rates exceed cache demote rates resulting in I/O request queuing. The described solutions determine the effect of adding unused memory space to the active cache to reduce the cache miss rate to be below the cache demote rate so that I/O requests are not queued. The technological solutions of the described embodiments monitor cache miss and cache demote rates during time intervals to determine whether to signal the user to add unused cache space, or ghost cache space, to the active cache to avoid the queueing of I/O requests.

Figure 1:
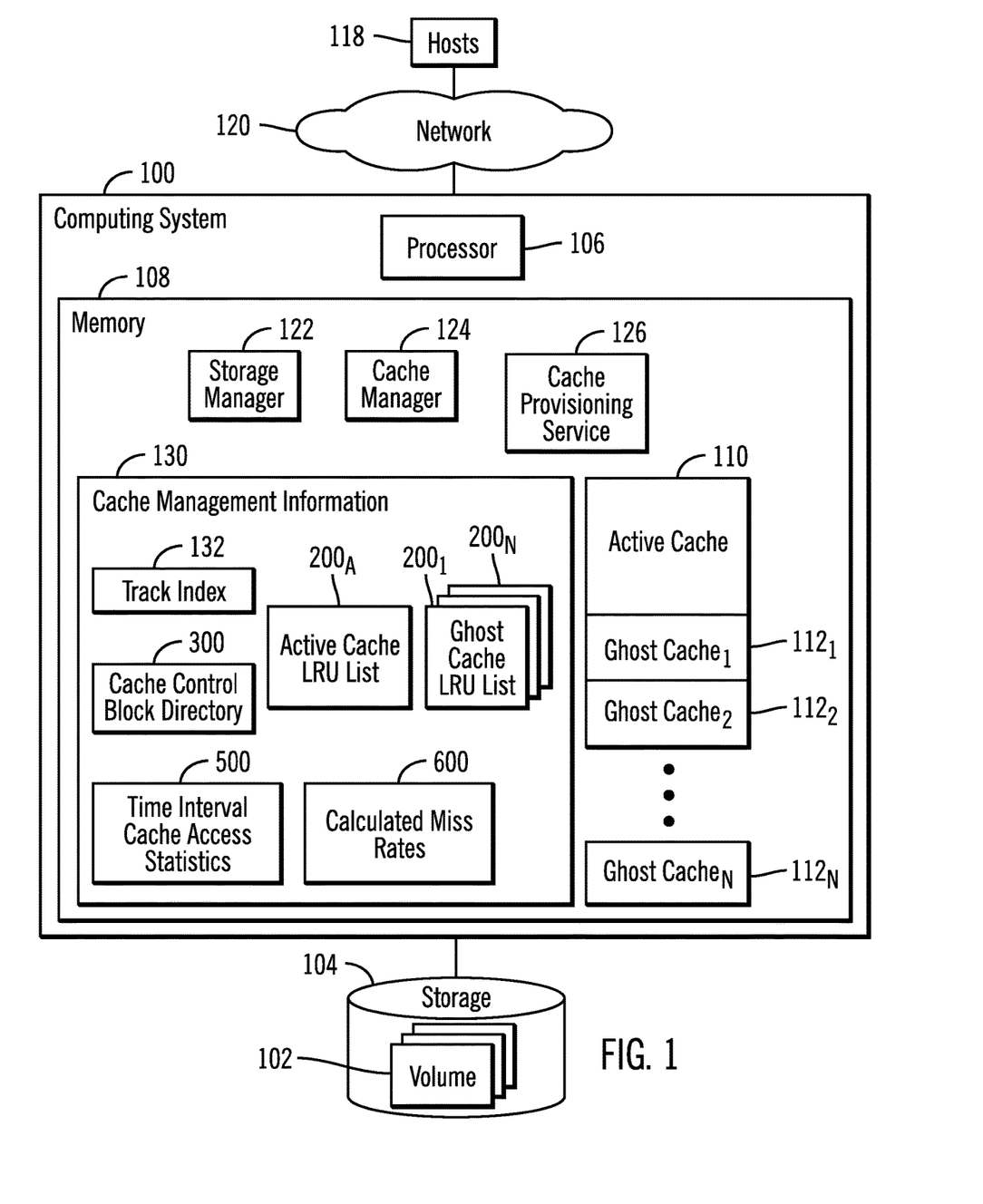
FIG. 1 illustrates an embodiment of a computing environment.

FIG. 1 illustrates an embodiment of a computing environment. A computing system 100 accesses data in volumes 102 (e.g., Logical Unit Numbers, Logical Devices, Logical Subsystems, etc.) configured in a storage 104. The computing system 100 includes a processor 106 and a memory 108, including an active cache 110 to cache data for the storage 104. The processor 106 may comprise one or more central processing units (CPUs) or a group of multiple cores on a single CPU. The active cache 110 buffers data requested by processes within the computing system. Alternatively, the computing system 100 may comprise a storage controller that processes Input/Output (I/O) access requests for tracks in the storage 104 from hosts 118 connecting to the computing system 100 (storage controller) over a network 120.

The memory 108 may further include a plurality of memory space partitions that are not available for use in the computer system 100 referred to as ghost caches $112_1$, $112_2$ ... $112_N$. Each ghost cache $112_1$, $112_2$ ... $112_N$ comprises a reserved partition of the memory space 108 that has not been allocated to the active cache 110 and may be allocated to the active cache 110 to increase the amount of memory space in the active cache 110. The unused memory space partition for each ghost cache $112_1$, $112_2$ ... $112_N$ may be separately and independently added to the active cache 110.

The memory 108 further includes a storage manager 122, cache manager 124, and cache provisioning service 126. The storage manager 122 manages access requests from internal processes in the computing system 100 and/or from hosts 118 for tracks in the storage 104. The cache manager 124 maintains accessed tracks in the active cache 110 for future read access to the tracks to allow the accessed tracks to be returned from the faster access cache 110 instead of having to retrieve from the storage 104. A track may comprise any unit of data configured in the storage 104, such as a track, Logical Block Address (LBA), etc., which is part of a larger grouping of tracks, such as a volume, logical device, etc. The cache provisioning service 126 may manage adding memory space partitions for one or more of the ghost caches $112_1$, $112_2$ ... $112_N$ to the active cache 110, such as if the user of the computer system 100 pays a fee to a service provider of the computer system 100 for additional memory space. In this way, partitions of the memory 108 designated as ghost caches $112_1$, $112_2$ ... $112_N$ that are initially configured as reserved but unavailable in the computer system 100, can later be activated by the cache provisioning service 126 to add to the active cache 110 upon user payment of a fee when additional memory space is needed in the cache 110. In one embodiment, the cache provisioning service 126 can solicit payment information from the user to add one or more of the unused partitions of the ghost caches $112_1$, $112_2$ ... $112_N$. Alternatively, the user of the computer system 100 may interact with an Internet based web service to purchase additional memory partitions, and the remote Internet based web service may signal the cache provisioning service 126 to add purchased partitions of memory of the ghost caches $112_1$, $112_2$ ... $112_N$ to the active cache 110.

The cache manager 124 maintains cache management information 130 in the memory 108 to manage read (unmodified) and write (modified) tracks in the cache 110. The cache management information 130 may include a track index 132 providing an index of tracks in the cache 110 to cache control blocks in a control block directory 300; an active cache Least Recently Used (LRU) list $200_A$ for tracks in the cache 110; and one or more ghost cache LRU lists $200_1$ ... $200_N$ to indicate tracks that could have been stored in the cache 110 if additional memory space was added to the cache to store the tracks indicated in the ghost cache LRU lists $200_1$ ... $200_N$. Each ghost cache LRU list $200_1$ ... $200_N$ may be associated with one of the ghost caches $112_1$, $112_2$ ... $112_N$. However, tracks indicated in the ghost cache LRU lists $200_1$ ... $200_N$ are not stored in the ghost caches $112_1$, $112_2$ ... $112_N$ or any other part of the memory 108. The control block directory 300 includes the cache control blocks, where there is one cache control block for each track in the cache 110 providing metadata on the track in the cache 110. The track index 132 associates tracks with the cache control blocks providing information on the tracks in the cache 110. Upon determining that the active cache LRU list $200_A$ is full or has reached a threshold level, the active cache LRU list $200_A$ is used to determine tracks to demote.

In one embodiment, there may only be cache control blocks 300 for the tracks in the cache 110 and no cache control blocks are allocated for tracks indicated in the ghost cache LRU lists $200_1$ ... $200_N$. A track indicated in the ghost cache LRU lists $200_1$ ... $200_N$ is not stored in the cache 110. In an alternative embodiment, the cache control block directory 300 may maintain ghost cache control blocks for tracks indicated in the ghost cache LRU lists $200_1$ ... $200_N$ even though they are not stored in the cache 110. In one such embodiment using ghost cache control blocks for tracks indicated in the ghost cache LRU lists $200_1$ ... $200_N$, the cache control blocks used for tracks in the ghost cache LRU lists $200_1$ ... $200_N$, may be the same as those used for tracks in the cache 110, such as shown for FIG. 3, without information specific to the track being maintained in the cache 110. In a still further alternative embodiment, the cache control blocks used for tracks in the ghost cache LRU lists $200_1$ ... $200_N$ may have fewer fields and less information than those for tracks maintained in the cache 110, such as shown in FIG. 4. In such embodiments, ghost cache control blocks for tracks indicated in the ghost cache LRU lists $200_1$ ... $200_N$ may only maintain information about the ghost cache LRU list $200_1$ ... $200_N$ where the track is indicated. For instance, for a track in the cache 110, a cache control block may require 256 bytes for a 4K block, but a ghost cache control block for a track only indicated in one of the ghost cache LRU lists $200_1$ ... $200_N$ may only comprise 20 bytes.

During caching operations, the cache manager 124 may gather for specific intervals of time, such as 15 second intervals, cache access statistics 500 on access to tracks in the cache 110 indicated in the active cache LRU list $200_A$ and tracks indicated in the ghost cache LRU lists $200_1$ ... $200_N$, which are not stored in the cache 110 or the ghost caches $112_1$, $112_2$ ... $112_N$. The cache manager 124 may further calculate cache miss rates 600 for the currently used cache 110 and for a hypothetical expanded cache having space to store tracks indicated in one or more ghost cache LRU cache lists $200_1$ ... $200_N$. For instance, if there are N tiers or levels of ghost caches that are being considered, then there are N ghost cache LRU lists $200_1$ ... $200_N$ and N instances of ghost cache miss rates may be calculated. The ghost cache miss rate i for ghost caches $112_i$ for i=1 to N is based on the cache miss rate if the active cache 110 and all ghost caches $112_1$ ... $112i$ were available to cache tracks. Each of the N ghost cache LRU lists $200_1$ ... $200_N$ may have the same number of track entries. This allows one to compare how the cache miss rate would improve if different amounts of memory or the ghost caches $112_1$, $112_2$ ... $112_N$ are added to the cache 110. For instance, each ghost cache level may add a fixed amount of memory space, where each increasing level i may add i times the fixed amount of memory space. Alternatively, the levels may correspond to variable amounts of memory space to be added.

Providing information on cache miss rates for adding different amounts of memory informs administrators on specific improvements that could be realized for adding specific amounts of memory.

In the described embodiments, the lists $200_A$ and $200_1 \ldots 200_N$ comprise LRU lists. In alternative embodiments, the lists $200_A$ and $200_1 \ldots 200_N$ may comprise other types of lists to organize indication of tracks in the cache 110.

The storage manager 122, cache manager 124, and cache provisioning service 126 are shown in FIG. 1 as program code loaded into the memory 108 and executed by the processor 106. Alternatively, some or all of the functions may be implemented in hardware devices in the storage controller 104, such as in Application Specific Integrated Circuits (ASICs).

The storage 104 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise a suitable volatile or non-volatile memory devices, including those described above.

The network 120 may comprise a Storage Area Network (SAN), a Local Area Network (LAN), a Wide Area Network (WAN), the Internet, and Intranet, etc.

Figure 2:
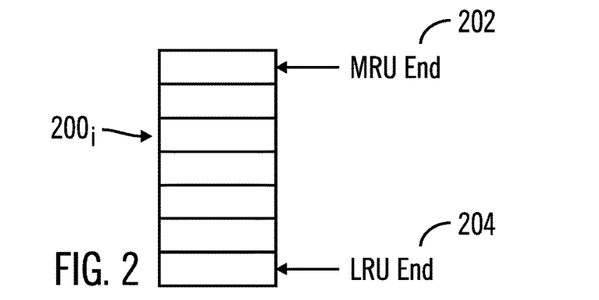
FIG. 2 illustrates an embodiment of a Least Recently Used (LRU) list.

FIG. 2 illustrates an embodiment of one of the LRU lists $200_i$, such as LRU cache lists $200_A$ and $200_1 \ldots 200_N$, as having a most recently used (MRU) end 202 identifying a track most recently added to the cache 110 or most recently accessed in the cache 110 and a least recently used (LRU) end 204 from which the track identified at the LRU end 204 is selected to demote from the cache 110. The LRU end 204 points to a track identifier, such as a track identifier address or a cache control block index for the track, of the track that has been in the cache 110 the longest for tracks indicated in that list $200_A$. The ghost cache LRU lists $200_1 \ldots 200_N$ identify tracks that could have been stored in the cache if the corresponding memory space was added to the active cache 110 to store the tracks indicated in the ghost cache LRU lists $200_1 \ldots 200_N$.

Figure 3:
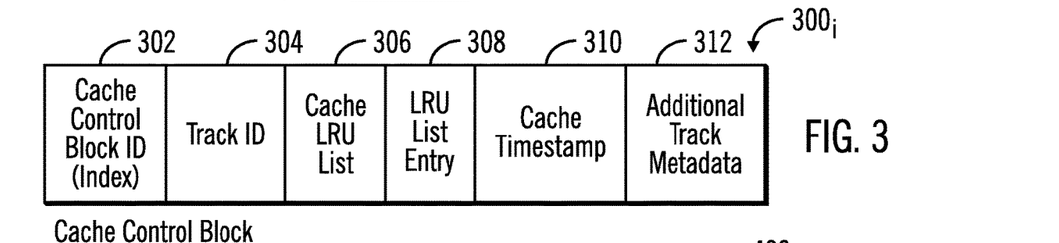
FIG. 3 illustrates an embodiment of a cache control block.
Figure 4:
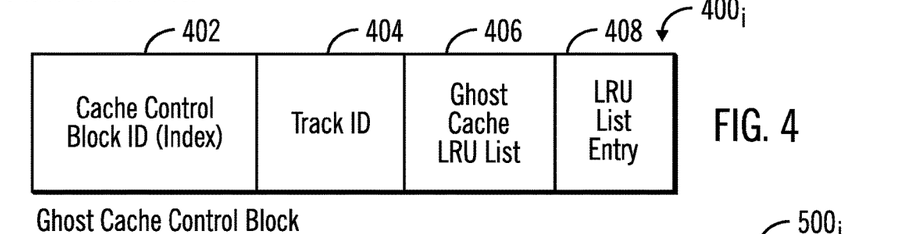
FIG. 4 illustrates an embodiment of a ghost cache control block.

FIG. 3 illustrates an embodiment of a cache control block $300_i$ for one of the tracks in the active cache 110, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 110 and indicated on the LRU list 304; and additional track metadata 312 typically maintained for tracks stored in the cache 110.

FIG. 4 illustrates an embodiment of a ghost cache control block $400_i$ that may be maintained for a track indicated in the ghost cache LRU lists $200_1 \ldots 200_N$, but not stored in the cache 110. The ghost cache control block $400_i$ includes fields 402, 404, 406, and 408 having the same type of information in fields 302, 304, 306, 308, respectively, in the cache control block $300_i$, but providing information on the ghost cache LRU list 406 and an entry 408 in the ghost cache LRU list entry for the track. The cache control block directory 300 may include cache $300_i$ and ghost $400_i$ cache control blocks.

Figure 5:
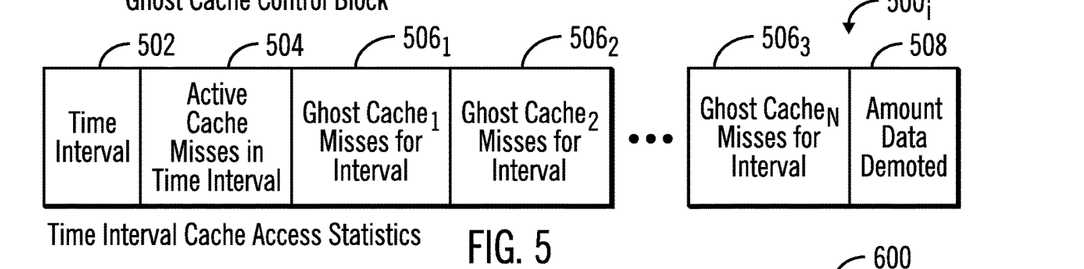
FIG. 5 illustrates an embodiment of time interval cache access statistics gathered over a time interval.

FIG. 5 illustrates an instance of time interval cache statistics $500_i$ gathered for one time interval. The cache manager 124 may gather cache access statistics for time intervals within a large time period during caching operations. The time interval cache access statistics $500_i$ identify the time interval 502 for which the information is gathered; active cache misses in the time interval 504 for the active cache 110, where a cache miss comprises a read to a track in a volume 102 that is not in the active cache 110; ghost cache $112_i$ cache misses for the interval $506i$, for $i=1 \ldots N$, indicating a number of cache misses if ghost caches $112_1 \ldots 112_1$ were added to the active cache 110; and an amount of data demoted 508 from the active cache 110 during the time interval 502.

Figure 6:
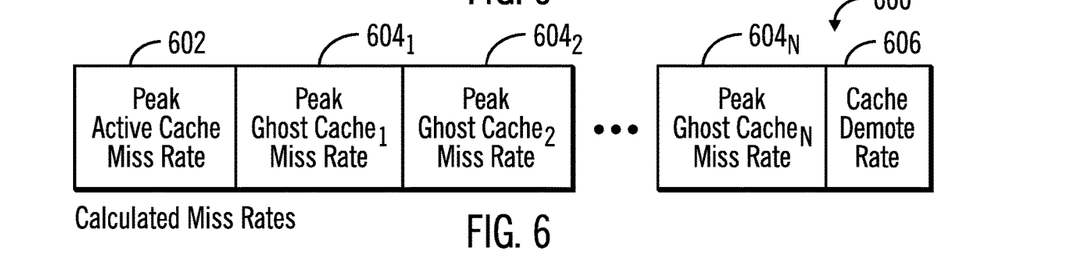
FIG. 6 illustrates an embodiment of calculated miss rates based on the time interval cache statistics.

FIG. 6 illustrates an embodiment of calculated miss rates 600 calculated from the gathered access statistics 500, including a peak active cache miss rate 602 comprising a highest active cache miss rate for the time intervals $500_i$, where the active cache miss rate is calculated by dividing the number of cache misses 504 in the time interval by an amount of time in the time interval and then multiplying that quotient by an average Input/Output ("I/O") size. The peak active cache miss rate 602 may comprise the cache miss rate calculated from the greatest active cache misses 504 from the maintained time interval cache statistics $500_i$. The access statistics 600 further include peak ghost cache miss rates $604_1 \ldots 604_N$ calculated for each of the ghost caches $112_1$, $112_2 \ldots 112_N$, where each peak ghost cache miss rate $604_i$ may be calculated by dividing the highest ghost cache misses $506_i$ for all time intervals divided by the time interval, and then multiplying that division result by the average I/O size. A cache demote rate 606 comprises the amount of data demoted from the cache 508 for all time intervals divided by a total amount of time of all the considered time intervals. For instance, if there are twenty 15 second intervals stored, then the total amount of time of the time intervals comprises 5 minutes.

Figure 7:
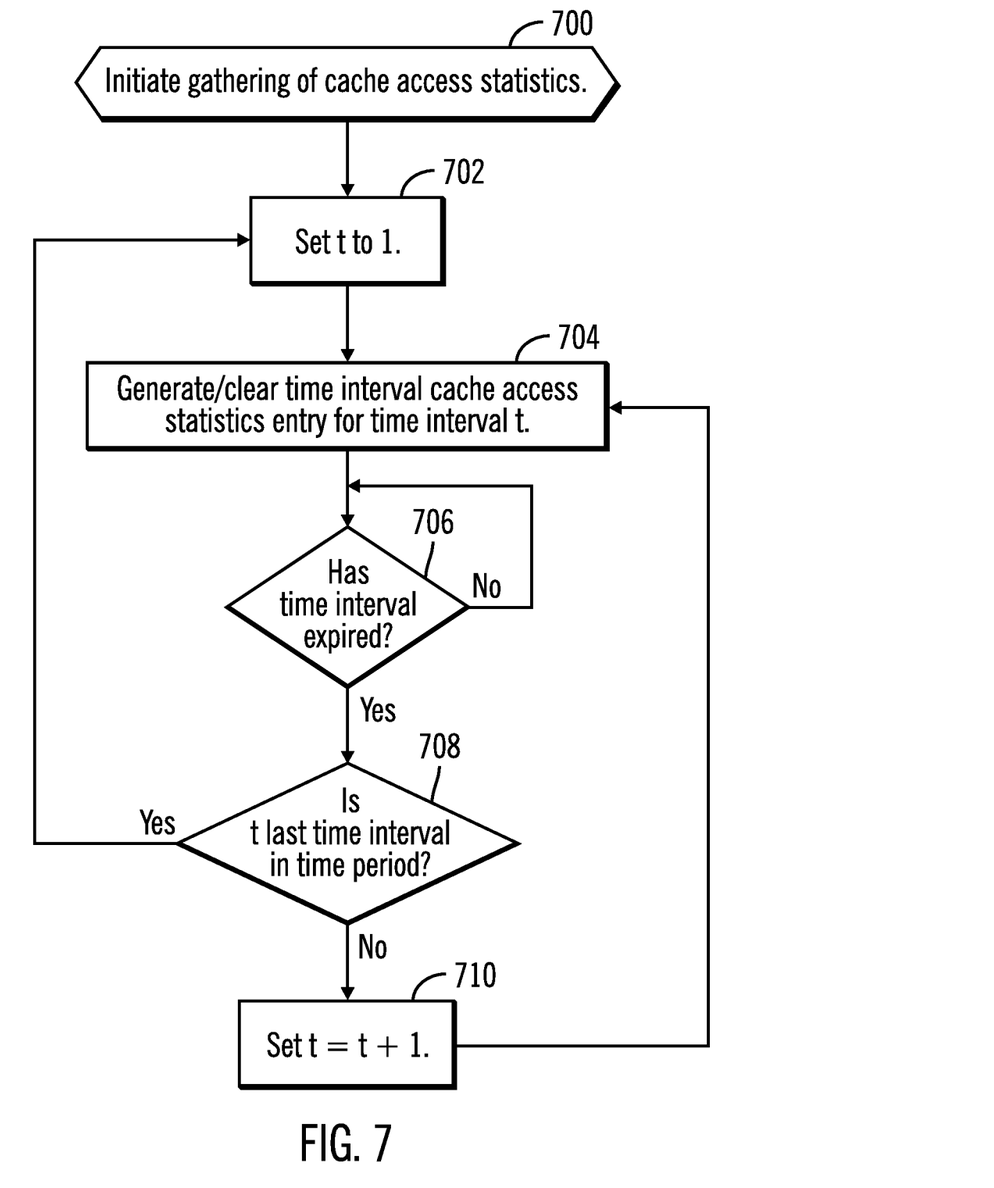
FIG. 7 illustrates an embodiment of operations to initiate gathering of cache statistics.

FIG. 7 illustrates an embodiment of operations performed by the cache manager 124 to generate a current time interval cache access statistics $500_i$. Upon initiating (at block 700) the gathering of cache access statistics, a variable i is set (at block 702) to 1. Time interval cache statistics $500_t$ for time interval t are generated (at block 704) or cleared if there is already an entry $500_t$ for the time interval t. When (at block 706) the current time interval t expires, if (at block 708) t is not the last time interval in a time period, then t is incremented (at block 710) by one and control proceeds back to block 704. If the time interval t is the last time interval in a time period, then control proceeds back to block 702 to reset the time interval to the first time interval, and then sequence through the time intervals in the time period.

Figure 8A:
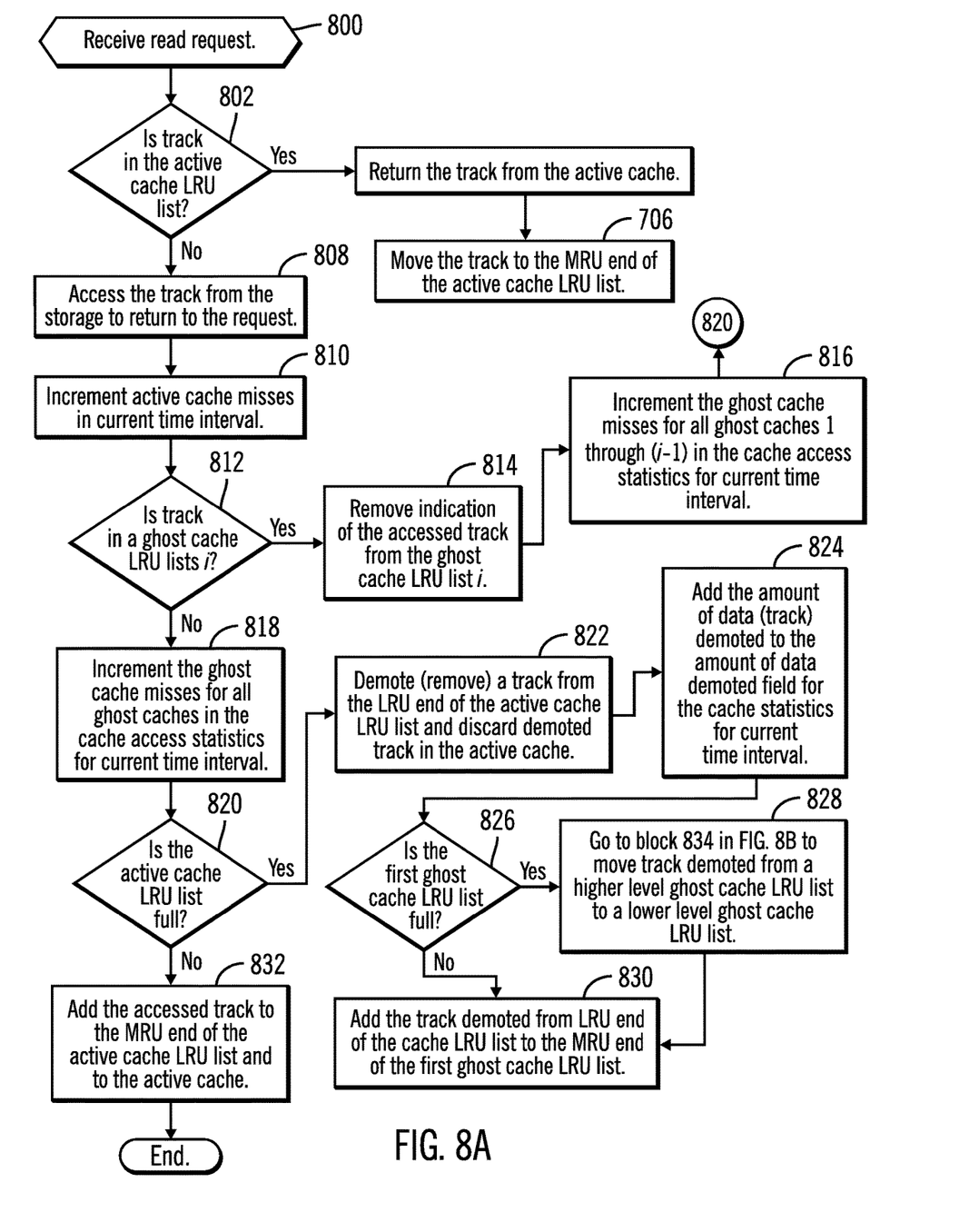
FIGS. 8A and 8B illustrate an embodiment of an operation to process a read request to a track.
Figure 8B:
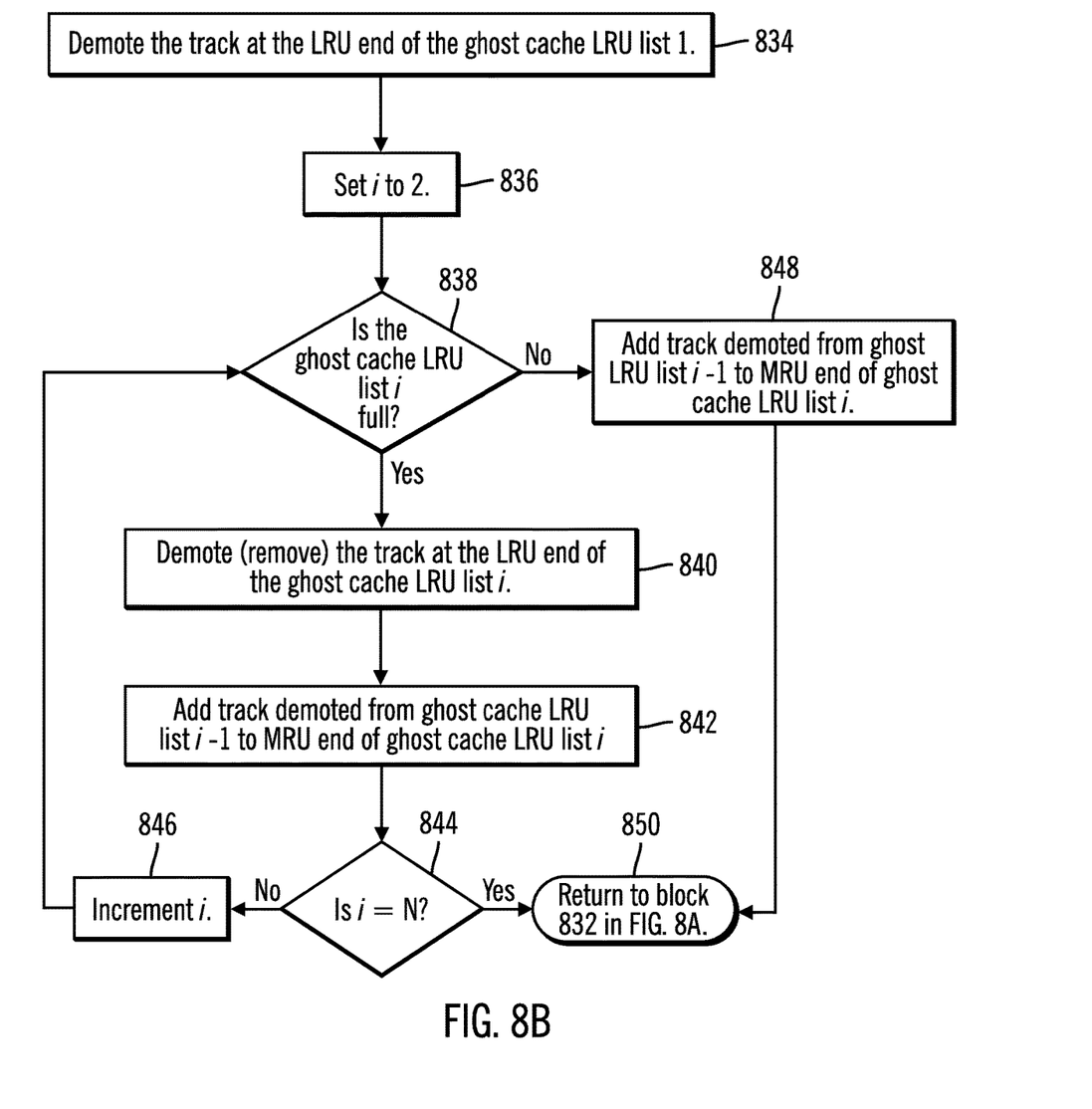

FIGS. 8a and 8b illustrate an embodiment of operations performed by the cache manager 124 to process a read request to a track in the storage 104. Upon receiving (at block 800) a read request to a track, if (at block 802) the track is indicated in the active cache LRU list $200_A$, then the track is returned (at block 804) to the request from the active cache 110 and the indication of the accessed track is moved (at block 806) to the MRU end 202 of the active cache LRU list $200_A$, such as by adjusting the LRU list entries 308, or LRU pointers, for the accessed track in the active cache LRU list $200_A$.

If (at block 802) the track is not indicated in the active cache LRU list $200_A$, then the track is accessed (at block 808) from the storage 104 to return to the request. The cache manager 124 increments (at block 810) the active cache misses 504 in the cache access statistics $500_t$ for the current time interval t. If (at block 812) the track is in a ghost cache LRU list $200_i$ of the ghost cache LRU lists $200_1 \ldots 200_N$, then the cache manager 124 removes (at block 814) indication of the accessed track from the ghost cache LRU list $200_i$. The cache manager 124 increments (at block 816) the ghost cache misses $506_1, 506_2 \ldots 506_{i-1}$ in the cache access statistics $500_t$ for the current interval for all ghost caches $112_1, 112_2 \ldots 112_{i-1}$ prior to the ghost cache $112_i$ whose ghost cache LRU list $200_i$ indicates the accessed track. These indications are made to indicate that the track was missed in all ghost caches LRU lists $200_1 \ldots 200_{i-1}$ up to the ghost cache LRU list $200_i$ indicating the accessed track because a cache size corresponding to the size of the active cache $200_A$ and all ghost caches $112_1 \ldots 112_{i-1}$ was not large enough to include the accessed track. If (at block 812) the track is not any of the ghost cache LRU list $200_1 \ldots 200_N$, then the cache manager 124 increments (at block 818) the ghost cache misses $506_1, 506_2 \ldots 506_N$ in the cache access statistics $500_t$ for the current time interval t for all ghost caches $112_1, 112_2 \ldots 112_N$.

From block 816 or 818, after incrementing the ghost cache read misses $506_1, 506_2 \ldots 506_N$ for some or all of the ghost caches, if (at block 820) the active cache LRU list $200_A$ is full, then the track at the LRU end 204 of the active cache LRU list $200_A$ is demoted (at block 822) and discarded from the active cache 110. The amount of data (track) demoted is added (at block 824) to the amount of data demoted 508 field for the cache statistics $500_t$ for the current time interval t. If (at block 826) the first ghost cache LRU list $200_1$ is not full, then the indication of the track demoted from the active cache 110 is added (at block 830) from the LRU end 204 of the active cache LRU list $200_A$ to the MRU end 202 of the first ghost cache LRU list $200_1$. From block 830 or if (at block 820) the active cache LRU list $200_A$ is not full, the cache manager 122 adds (at block 832) the accessed track (from the active $200_A$ or ghost cache $200_i$ LRU list) to the MRU end 202 of the cache LRU list $200_A$.

If (at block 826) the first ghost cache LRU list $200_1$ is full, then control proceeds to block 828 to adjust the ghost cache LRU lists $200_1 \ldots 200_N$ by demoting (removing) indication of a track from the LRU end 204 of one ghost cache LRU list 200i and adding the demoted track to the MRU end 202 of a next ghost cache LRU list $200_{i+1}$, until the last Nth ghost cache LRU list $200_N$ is reached, such that the track demoted from the LRU end 204 of the last ghost cache LRU list $200_N$ is demoted without adding to a further ghost cache LRU list. Control proceeds (at block 828) to block 834 in FIG. 8b to move a track through the ghost cache LRU lists $200_1 \ldots 200_N$ when room needs to be made for a track demoted from the cache LRU list $200_A$. At block 834, the cache manager 124 demotes (at block 834) the track at the LRU end 204 of the first ghost cache LRU list $200_1$. A variable i is set (at block 836) to two for the next ghost cache LRU list $200_2$ to start the cascade of demotions of tracks through the ghost cache LRU lists $200_1 \ldots 200_N$. If (at block 838) the ghost cache LRU list $200_i$ is full, then the cache manager 124 demotes (removes) (at block 840) a track at the LRU end 204 of the ghost cache LRU list $200_i$ and adds (at block 842) the track demoted from the ghost cache LRU list $200_{i-1}$ to the MRU end 202 of the ghost cache LRU list $200_i$. If (at block 844) i is not equal to N, i.e., there is another ghost cache LRU list $200_{i+1}$ to which a track demoted from the last considered ghost cache LRU list $200_i$ can be added, then i is incremented (at block 846) and control proceeds back to block 738 to move the track demoted from the last considered ghost cache LRU list to a further ghost cache LRU list.

If (at block 838) the ghost cache LRU list $200_i$ is not full, then the track demoted from the ghost cache LRU list $200_{i-1}$ is added (at block 848) to the MRU end 202 of the ghost cache LRU list $200_i$. From block 848 or if (at block 844) i is N, i.e., the last ghost cache LRU list $200_N$ was processed, then control proceeds (at block 850) back to block 828 in FIG. 8a.

With the described operations of FIGS. 8a and 8b, a track is demoted from one of the ghost cache LRU lists $200_i$ to make room to add a track demoted from the active cache 110 or from a previous ghost cache LRU list $200_{i-1}$, so that a track demoted from the active cache 110 moves sequentially through ghost cache LRU lists $200_1$ through $200_N$ to simulate how the track would be managed if the cache had additional memory to accommodate tracks indicated in the ghost cache LRU lists $200_1 \ldots 200_N$.

When adding a track to the cache 110, the cache control block $300_i$ for that address in the cache 110 would be updated to include information on the track and the entry in the cache LRU list $200_A$ indicating the track. Further, the track index 132 would be updated to include the cache control block index for the track in the cache 110. In one embodiment, if a track is indicated in a ghost cache LRU list $200_i$, there may be no cache control block created for the track and indicated in the cache control block directory 300. In an alternative embodiment, a full cache control block $300_i$ may be created in the cache control block directory 300 for the track indicated in the ghost cache LRU list $200_i$. In a still further alternative embodiment, a smaller ghost cache control block $400_i$ may be added to the cache control block directory 300 for the track indicated in the ghost cache LRU list $200_i$ having minimal information to identify the track in one of the ghost cache LRU lists $200_i$. When a track is moved from one ghost cache LRU list $200_i$ to a next ghost cache LRU list $200_{i+1}$, then the information in the cache control block, such as in the ghost cache LRU list 406 and LRU list entry 408, for that track would be updated to indicate the new location in the new ghost cache LRU list 406 to which the track is added. The cache control block index for the ghost cache control block $400_i$ may be added to the track index 132 for the track indicated in the ghost cache LRU list $200_i$.

With the described embodiments of FIGS. 8a and 8b, tracks demoted from the active cache 110 and active cache LRU list $200_A$ are added to the ghost cache LRU list $200_i$ where accesses to the track once removed from the active cache 110 can be tracked as if the track is in the active cache 110. Accesses to a track indicated on the ghost cache LRU lists $200_1 \ldots 200_N$ can be used to determine the cache miss rate of the active cache 110 and ghost caches $112_1, 112_2 \ldots 112_N$ that would be realized if the cache 110 was expanded to include the space of one or more of the ghost caches $112_1, 112_2 \ldots 112_N$ to accommodate the tracks indicate in the ghost cache LRU lists $200_1 \ldots 200_N$.

Figure 9:
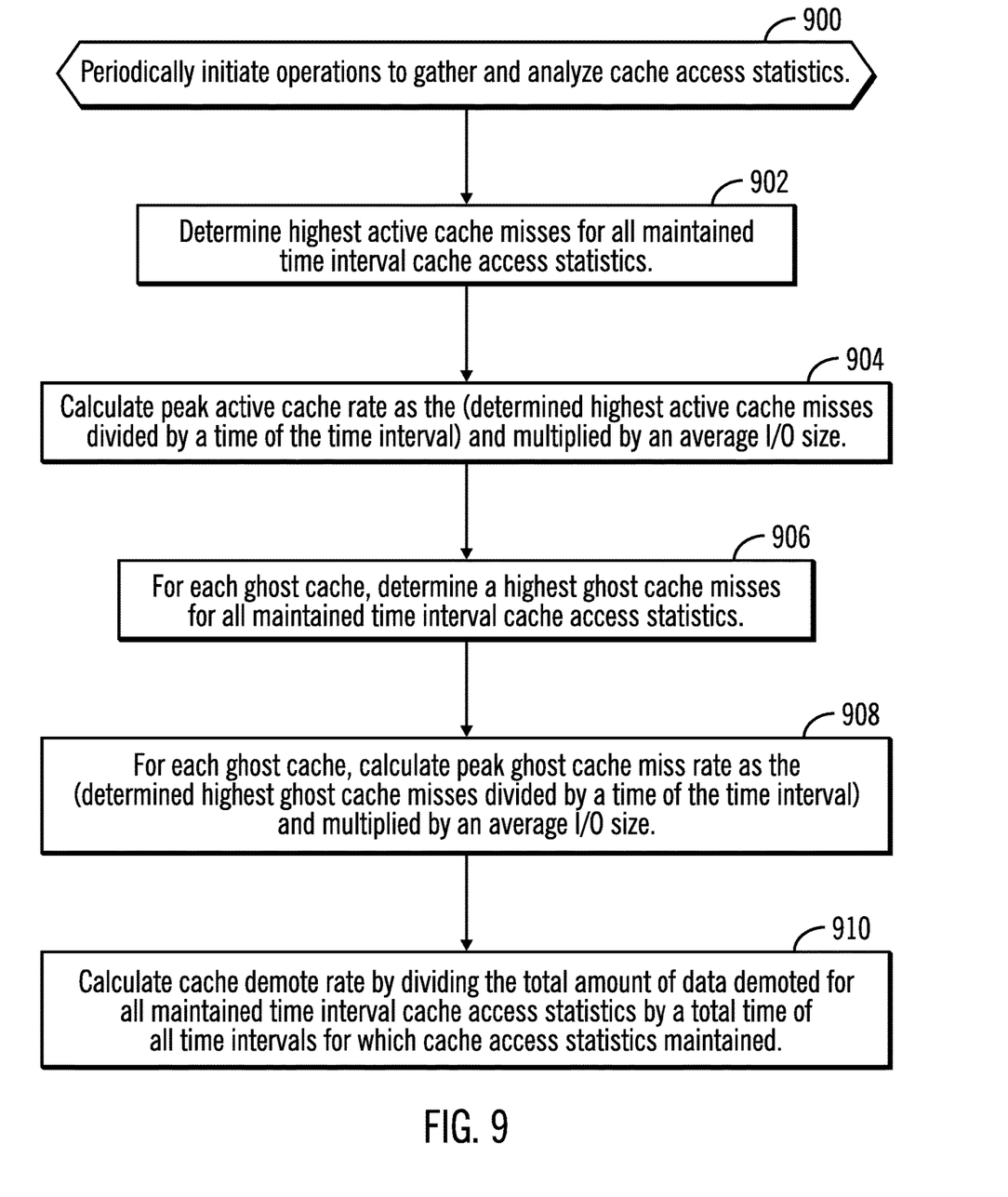
FIG. 9 illustrates an embodiment of operations to gather and analyze cache access statistics.

FIG. 9 illustrates an embodiment of operations performed by the cache manager 124 (or some other component) to periodically initiate operations to gather and analyze cache access statistics. Upon initiating (at block 900) such operations, the cache manager 124 determines (at block 902) the highest active cache misses 504 for all maintained time interval cache access statistics $500_i$. The cache manager 124 calculates (at block 904) a peak active cache rate 504 as the determined highest active cache misses $504_H$ across time intervals divided by a time of the time interval, and then multiplying the quotient is multiplied by an average I/O size. The average I/O size may be continually determined by the cache manager 124 based on size of I/O accesses. The cache manager 124 further determines (at block 906) a highest ghost cache miss rate for each of the ghost caches $112_1$, $112_2 \ldots 112_N$ across the cache access statistics $500_1 \ldots 500_T$ across all time intervals T. For each ghost cache $112_i$, the cache manager 124 calculates (at block 908) a peak ghost cache miss rate $604_i$ as the determined highest ghost cache misses $506_i$ across time intervals divided by a time of the time interval, and this quotient is multiplied by the average I/O size. The cache demote rate 606 is calculated by dividing the total amount of data demoted for all maintained time interval cache access statistics 500 by a total time of all time intervals for which cache access statistics are considered.

With the described embodiments, active and ghost cache miss rates are calculated based on actual cache miss rates to the active cache and determinations as to whether cache misses would have occurred had ghost cache space been added to the active cache space.

In described embodiments, peaks miss rates are calculated for the active and ghost caches. In alternative embodiment, the calculated miss rates for active and ghost caches may comprise another calculated value based on time interval cache statistics 500, such as an average, mean, etc.

Figure 10:
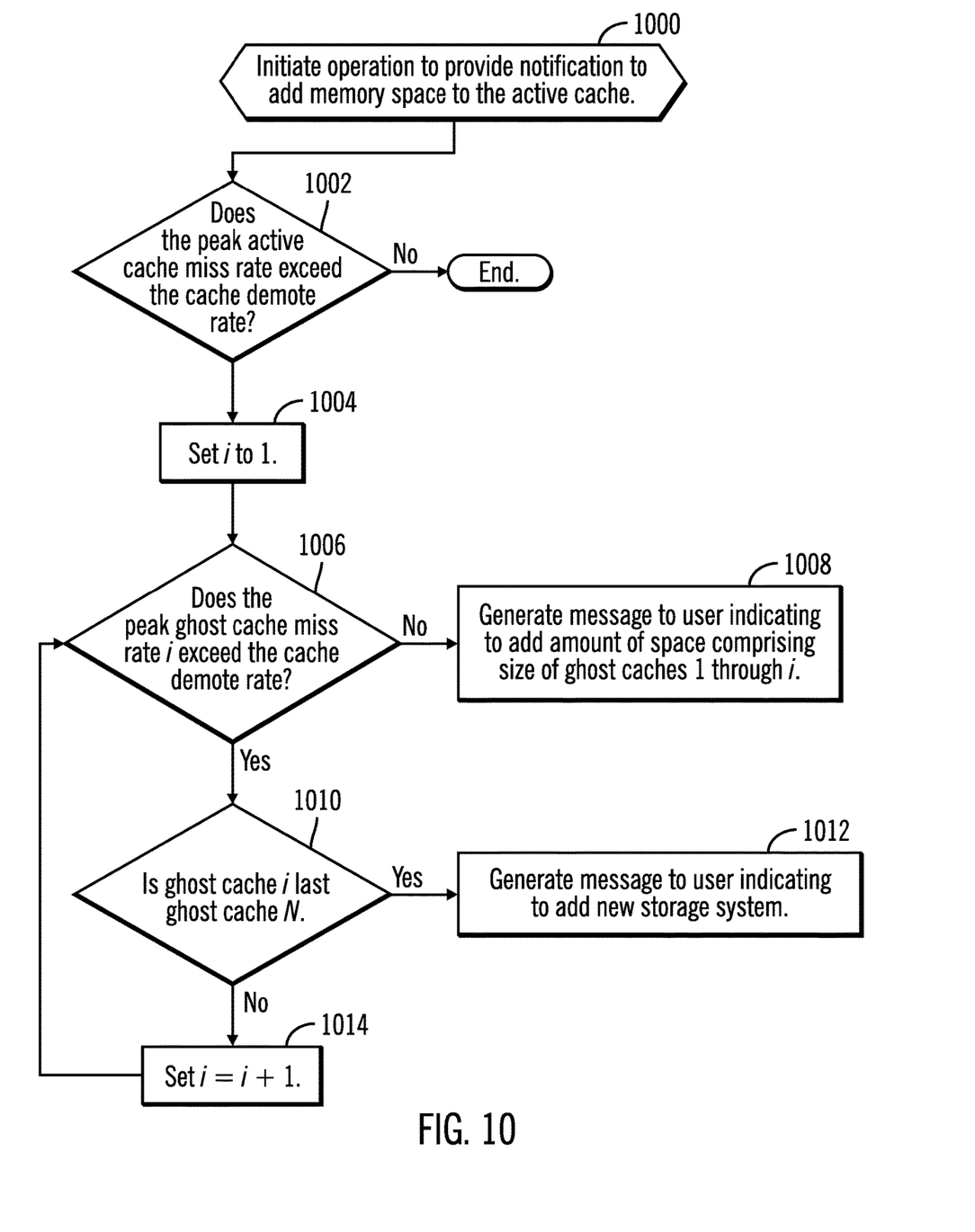
FIG. 10 illustrates an embodiment of operations to provide notification to add memory space to the active cache.

FIG. 10 illustrates an embodiment of operations performed by the cache provisioning service 126 to determine whether to notify the user to add memory space to the active cache 110. Upon initiating (at block 1000) an operation to add memory space partitions for the ghost caches $112_1$, $112_2 \ldots 112_N$ to the active cache 110, the cache provisioning service 126 determines (at block 1002) whether the peak active cache miss rate 602 exceeds the cache demote rate 606. If not, control ends. Otherwise, if (at block 1002) the cache demote rate 606 is exceeded, then a variable i is set (at block 1004) to one and a determination is made (at block 1006) whether the peak ghost cache miss rate $604_i$ for the ith ghost cache $112_i$ exceeds the cache demote rate 606. If not, then the cache provisioning service 126 generates (at block 1008) a message to a user indicating to add an amount of memory space comprising the memory size of ghost caches $112_1$, $112_2$ through $112_i$. The message may be sent via email, text message, or displayed on a display monitor of the computer system 100. If (at block 1006) the cache demote rate is exceeded and if (at block 1010) the ghost cache $112_i$ considered is the last ghost cache list $112_N$, then the cache provisioning service 126 generates (at block 1012) a message to a user indicating to add an entire new computer system 100, such as a storage controller, because the remaining ghost cache $112_1$, $112_2 \ldots 112_N$ partitions are cumulatively not of sufficient size to reduce the cache miss rate below the cache demote rate 606. If (at block 1010) ghost cache $112_i$ does not comprise the last ghost cache $112_N$, then the variable i is incremented by one (at block 1014) and control proceeds back to block 1006 to consider whether adding a next incremental memory space of the next ghost cache $112_{i+1}$ would reduce the cache miss rate below the cache demote rate 606.

Figure 11:
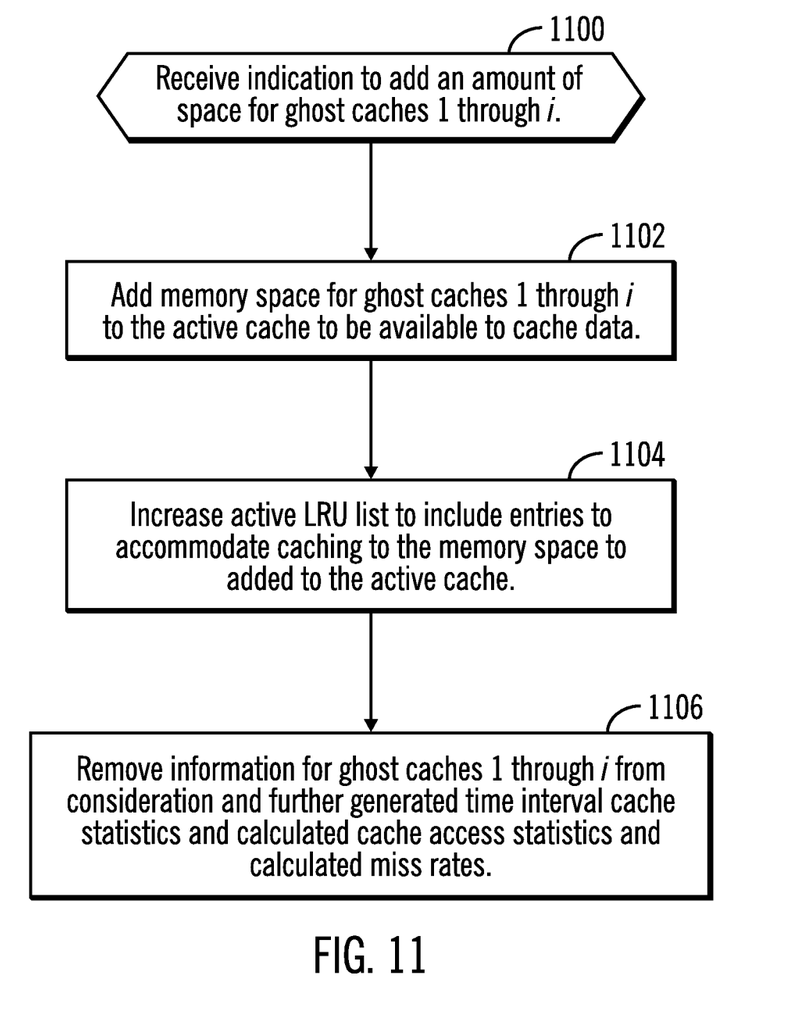
FIG. 11 illustrates an embodiment of operations to add memory space to the active cache.

FIG. 11 illustrates an embodiment of operations performed by the cache provisioning service 126 to add an amount of space for ghost caches $112_1$, $112_2 \ldots 112_i$. The cache provisioning service 126 may interact directly with the user through the computer system 100 to solicit and receive payment to add additional memory space partitions for one or more of the ghost caches $112_1$, $112_2 \ldots 112_N$. Alternatively, the cache provisioning service 126 may receive an instruction to add additional memory space from a remote server that handles the transaction with the customer to add memory space, which may involve the user of the computer system 100 purchasing the additional memory space. Upon receiving (at block 1100) indication to add memory space partitions for ghost caches $112_1$ through $112_i$, the cache provisioning service 126 would issue the instruction to add memory space partitions for the one or more ghost caches $112_1$, $112_2 \ldots 112_N$ for which payment was received from the user. Alternatively, the user of the computer system 100 may interact with an Internet based web service to purchase additional memory partitions, and the remote Internet based webs service would send the cache provisioning service 126 the instruction to add partitions of memory of the ghost caches $112_1$, $112_2 \ldots 112_N$ to the active cache 110. Upon receiving the instruction, the cache provisioning service 126 adds (at block 1102) memory spaces for ghost caches $112_1$ through $112_i$ to the active cache 110 to be available to cache data. To accomplish this, the cache provisioning service 126 may increase (at block 1104) the active cache LRU list $200_A$ to include entries to accommodate caching to the memory space added to the active cache 110. Information on the provisioned ghost caches $112_1$ through $112_i$ is removed (at block 1106) from consideration and further generated time interval cache access statistics $500_i$ and the calculated miss rates 600.

With the described embodiments, ghost cache miss rates $604_i$ may be calculated to provide information on an expected cache miss rate would if unused memory space for ghost caches 1 through i is allocated to the active cache 110 and available for use. When the active cache miss rate falls below the cache demote rate, then I/O requests may experience significant delays to wait for space in the cache to be demoted to make room for further I/O requests. Described embodiments determine whether adding partitions of memory space designated as ghost caches would improve the cache miss rate to fall below the cache demote rate. If adding memory partitions for one or more of the ghost caches would improve the cache miss rate to avoid exceeding the cache demote rate, then the user may be given the option to add the memory space partitions for one or more of the ghost caches to the active cache 110 to improve the cache miss rate to an acceptable level.

In the described embodiment, variables "i", "t", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
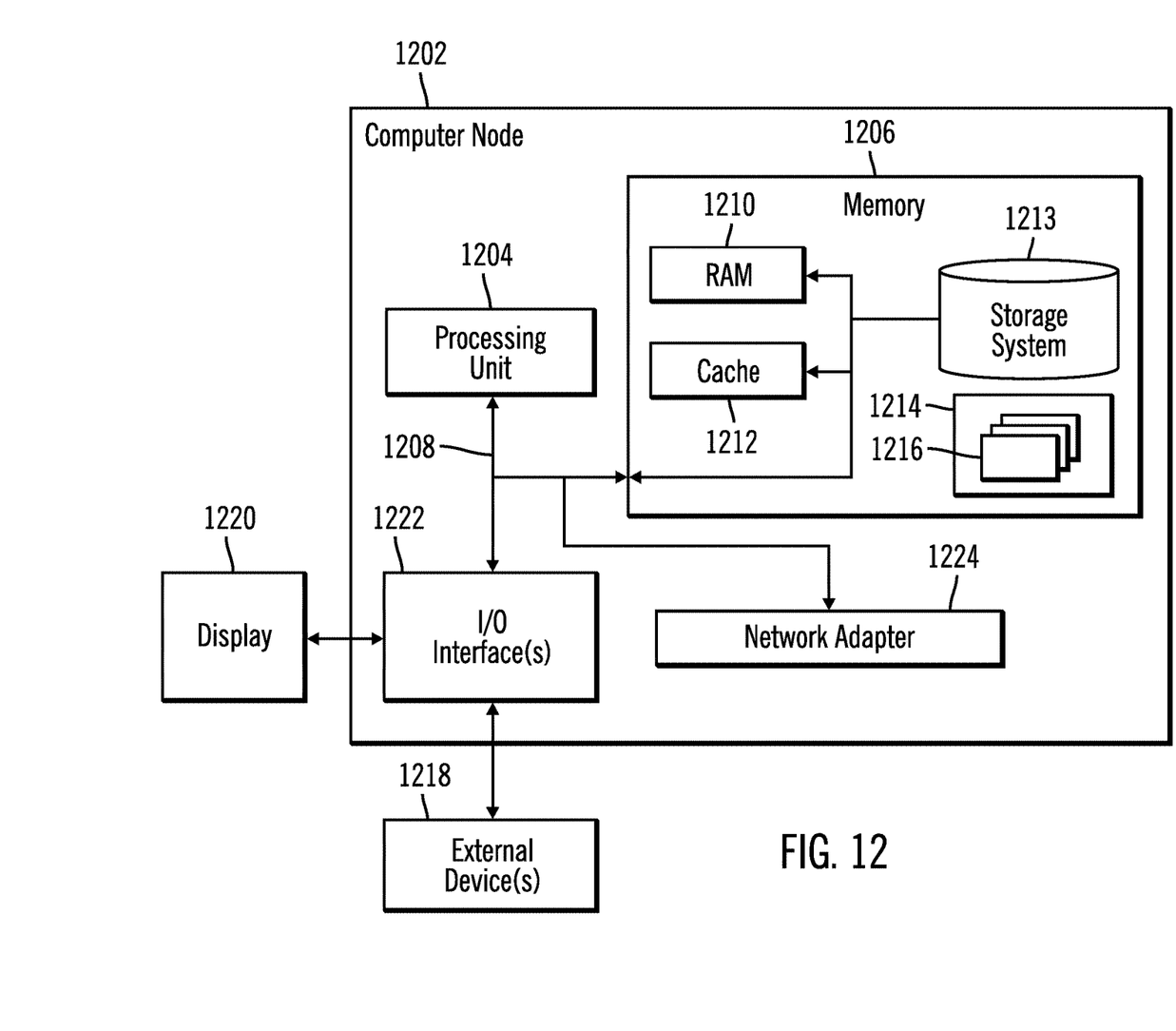
FIG. 12 illustrates a computing environment in which the components of FIG. 1 may be implemented.

The computational components of FIG. 1, including the hosts 118 and computing system 100 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing an active cache in a computer system to cache tracks stored in a storage, the computer program product comprising a computer readable storage medium having computer readable program code embodied therein that when executed performs operations, the operations comprising:
   determining whether adding additional memory space to the active cache would result in an active cache miss rate being less than a cache demote rate when the active cache miss rate exceeds the cache demote rate; and generating a message to a user of the computer system indicating to add the additional memory space to the active cache in response to determining that adding the additional memory space would result in the active cache miss rate being less than the cache demote rate.

2. The computer program product of claim 1, wherein the operations further comprise:
for each time interval of a plurality of time intervals, multiplying a number of the active cache misses per unit of time and an Input/Output ("I/O") size to determine the active cache miss rate; and
for each of the time intervals, gathering an amount of data per unit of time that was removed from the active cache, wherein the cache demote rate is based on the amount of data removed from the active cache during the time intervals.

3. The computer program product of claim 1, wherein the additional memory space corresponds to memory space in the computer system that is not yet made available for use in the active cache, wherein the message to the user indicates to add to the active cache the additional memory space in the computer system not yet made available for use, wherein the operations further comprise:
receiving an instruction to add the additional memory space to the active cache in response to the user accepting to add the additional memory space; and
adding the memory space in the computer system to the active cache to expand a size of the active cache in response to the receiving the instruction.

4. The computer program product of claim 1, wherein the operations further comprise:
indicating a track demoted from the active cache in a ghost cache list; and
determining whether a ghost cache miss rate is less than the cache demote rate when the active cache miss rate exceeds the cache demote rate, wherein the additional memory space comprises an amount of memory space associated with the ghost cache list in response to determining that the ghost cache miss rate is less than the cache demote rate.

5. The computer program product of claim 4, wherein tracks indicated in the ghost cache list are not stored in the active cache.

6. The computer program product of claim 1, wherein there are a plurality of N ghost cache lists ordered from 1 to N, wherein tracks demoted from the active cache are indicated in ghost cache list 1, and wherein the operations further comprise:
for ghost cache lists i=2 through N, indicating in ghost cache list i a track demoted from ghost cache list (i-1), wherein ghost cache miss rate i for the ghost cache list i is based on a rate over time of accesses to tracks that are not indicated in the active cache or any of the ghost cache lists 1 through i, wherein the additional memory space comprises a total amount of space associated with the ghost cache lists 1 through i in response to determining that one of ghost cache miss rates for the ghost cache list i is less than the cache demote rate.

7. The computer program product of claim 6, wherein the operations further comprise:
demoting a track indicated in the ghost cache list 1 in response to the ghost cache list 1 being full when a track is demoted from the active cache to make an entry available in the ghost cache list 1 to indicate the track being demoted from the active cache; and
for ghost cache lists 2 through N, demoting a track indicated in the ghost cache list i in response to the ghost cache list i being full when a track is demoted from the ghost cache list (i-1) to make an entry available in the ghost cache list i to indicate the track being demoted from the ghost cache list (i-1).

8. A system coupled to a storage having tracks, comprising:
a processor;
an active cache implemented in at least one memory device; and
a computer readable storage medium having computer program code that in response to being executed by the processor performs operations, the operations comprising:
determining whether adding additional memory space to the active cache would result in an active cache miss rate being less than a cache demote rate when the active cache miss rate exceeds the cache demote rate; and
generating a message to a user of the system indicating to add the additional memory space to the active cache in response to determining that adding the additional memory space would result in the active cache miss rate being less than the cache demote rate.

9. The system of claim 8, wherein the operations further comprise:
for each time interval of a plurality of time intervals, multiplying a number of the active cache misses per unit of time and an Input/Output ("I/O") size to determine the active cache miss rate; and
for each of the time intervals, gathering an amount of data per unit of time that was removed from the active cache, wherein the cache demote rate is based on the amount of data removed from the active cache during the time intervals.

10. The system of claim 8, wherein the additional memory space corresponds to memory space in the system that is not yet made available for use in the active cache, wherein the message to the user indicates to add to the active cache the additional memory space in the system not yet made available for use, wherein the operations further comprise:
receiving an instruction to add the additional memory space to the active cache in response to the user accepting to add the additional memory space; and
adding the memory space in the system to the active cache to expand a size of the active cache and a size of the active cache in response to the receiving the instruction.

11. The system of claim 8, wherein the operations further comprise:
indicating a track demoted from the active cache in a ghost cache list; and
determining whether a ghost cache miss rate is less than the cache demote rate when the active cache miss rate exceeds the cache demote rate, wherein the additional memory space comprises an amount of memory space associated with the ghost cache list in response to determining that the ghost cache miss rate is less than the cache demote rate.

12. The system of claim 11, wherein tracks indicated in the ghost cache list are not stored in the active cache.

13. The system of claim 8, wherein there are a plurality of N ghost cache lists ordered from 1 to N, wherein tracks demoted from the active cache are indicated in ghost cache list 1, and wherein the operations further comprise:
for ghost cache lists i=2 through N, indicating in ghost cache list i a track demoted from ghost cache list (i-1), wherein ghost cache miss rate i for the ghost cache list i is based on a rate over time of accesses to tracks that are not indicated in the active cache or any of the ghost cache lists 1 through i, wherein the additional memory space comprises a total amount of space associated with the ghost cache lists 1 through i in response to determining that one of ghost cache miss rates for the ghost cache list i is less than the cache demote rate.

14. The system of claim 13, wherein the operations further comprise:
   demoting a track indicated in the ghost cache list 1 in response to the ghost cache list 1 being full when a track is demoted from the active cache to make an entry available in the ghost cache list 1 to indicate the track being demoted from the active cache; and
   for ghost cache lists 2 through N, demoting a track indicated in the ghost cache list i in response to the ghost cache list i being full when a track is demoted from the ghost cache list (i-1) to make an entry available in the ghost cache list i to indicate the track being demoted from the ghost cache list (i-1).

15. A method for managing an active cache in a computer system to cache tracks stored in a storage, comprising:
   determining whether adding additional memory space to the active cache would result in an active cache miss rate being less than a cache demote rate when the active cache miss rate exceeds the cache demote rate; and
   generating a message to a user of the computer system indicating to add the additional memory space to the active cache in response to determining that adding the additional memory space would result in the active cache miss rate being less than the cache demote rate.

16. The method of claim 15, further comprising:
   for each time interval of a plurality of time intervals, multiplying a number of the active cache misses per unit of time and an Input/Output ("I/O") size to determine the active cache miss rate; and
   for each of the time intervals, gathering an amount of data per unit of time that was removed from the active cache, wherein the cache demote rate is based on the amount of data removed from the active cache during the time intervals.

17. The method of claim 15, wherein the additional memory space corresponds to memory space in the computer system that is not yet made available for use in the active cache, wherein the message to the user indicates to add to the active cache the additional memory space in the computer system not yet made available for use, further comprising:
   receiving an instruction to add the additional memory space to the active cache in response to the user accepting to add the additional memory space; and
   adding the memory space in the computer system to the active cache to expand a size of the active cache and a size of the active cache in response to the receiving the instruction.

18. The method of claim 15, further comprising:
   indicating a track demoted from the active cache in a ghost cache list; and
   determining whether a ghost cache miss rate is less than the cache demote rate when the active cache miss rate exceeds the cache demote rate, wherein the additional memory space comprises an amount of memory space associated with the ghost cache list in response to determining that the ghost cache miss rate is less than the cache demote rate.

19. The method of claim 18, wherein tracks indicated in the ghost cache list are not stored in the active cache.

20. The method of claim 15, wherein there are a plurality of N ghost cache lists ordered from 1 to N, wherein tracks demoted from the active cache are indicated in ghost cache list 1, further comprising:
   for ghost cache lists i=2 through N, indicating in ghost cache list i a track demoted from ghost cache list (i-1), wherein ghost cache miss rate i for the ghost cache list i is based on a rate over time of accesses to tracks that are not indicated in the active cache or any of the ghost cache lists 1 through i, wherein the additional memory space comprises a total amount of space associated with the ghost cache lists 1 through i in response to determining that one of ghost cache miss rates for the ghost cache list i is less than the cache demote rate.

* * * * *